United States Patent
Kishimoto et al.

(10) Patent No.: US 6,721,239 B2
(45) Date of Patent: Apr. 13, 2004

(54) OPTICAL DISC DEVICE

(75) Inventors: Takashi Kishimoto, Nara (JP); Yuu Okada, Osaka (JP); Katsuya Watanabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 373 days.

(21) Appl. No.: 10/005,301

(22) Filed: Nov. 8, 2001

(65) Prior Publication Data

US 2002/0057630 A1 May 16, 2002

(30) Foreign Application Priority Data

Nov. 15, 2000 (JP) .......................... 2000-347793

(51) Int. Cl.⁷ .............................................. G11B 21/08
(52) U.S. Cl. ................................ 369/30.17; 369/30.15; 369/44.28
(58) Field of Search ........................ 369/30.17, 30.16, 369/30.15, 44.28, 44.27, 44.26, 44.29, 30.1, 30.11, 30.12, 30.13; 360/78.04, 78.06, 77.02

(56) References Cited

U.S. PATENT DOCUMENTS

| | | | | |
|---|---|---|---|---|
| 4,495,608 A | * | 1/1985 | Kimura et al. ........... | 369/30.17 |
| 4,887,254 A | * | 12/1989 | Nakatsu et al. .......... | 369/30.17 |
| 5,046,058 A | * | 9/1991 | Shimonou ................ | 369/30.17 |
| 5,088,075 A | * | 2/1992 | Yokota .................... | 369/30.16 |
| 5,235,576 A | * | 8/1993 | Shigemori ............... | 369/30.17 |
| 5,408,454 A | * | 4/1995 | Hasegawa ................ | 369/44.25 |
| 5,623,464 A | * | 4/1997 | Tani ....................... | 369/44.28 |
| 5,699,332 A | * | 12/1997 | Nakano ................... | 369/30.16 |
| 5,903,530 A | * | 5/1999 | Tateishi et al. .......... | 369/44.27 |
| 6,628,580 B1 | * | 9/2003 | Kishimoto et al. ...... | 369/44.28 |

* cited by examiner

Primary Examiner—Tan Dinh
(74) Attorney, Agent, or Firm—Merchant & Gould P.C.

(57) ABSTRACT

An optical disc device with high reliability, which is capable of performing a stable track jumping, is provided. In the optical disc device, a space (time interval) between an address part and the next address part in the address space measuring part 116 inside the DSP 111 is measured, and when the reproduction speed detected in the reproduction speed detection part 117 based on the measuring result is faster than a predetermined reproduction speed, an application timing of an accelerating pulse is switched in the accelerating/decelerating pulse generator 113 such that the application timing of an accelerating pulse or a decelerating pulse is matched with a transit timing in the address part.

27 Claims, 13 Drawing Sheets

OPTICAL DISC DEVICE

BACKGROUND OF THE INVENTION

1. Field of the Invention

The present invention relates to an optical disc device that uses an optical beam emitted from a light source such as a laser to reproduce information recorded optically on an information carrier. In particular, the present invention relates to a track jumping control for conducting a shift from an arbitrary track to another track on an information carrier in which a spiral information track formed as an uneven guide groove is divided in a radial direction and has an address part where position information is recorded in advance.

2. Description of the Related Art

In a conventional optical disc device, a tracking control is performed by shifting a converging lens in the radial direction of an information carrier using a tracking actuator. This tracking actuator is constructed of a fixed part and a movable part that is mounted on a converging lens, and the movable part and the fixed part are coupled together with an elastic body such as four pieces of wires (wire rod), rubber or the like. Then, when an electric current is supplied to a coil in the movable part, an electromagnetic force is generated between the coil and a permanent magnet in the fixed part, and this electromagnetic force allows the converging lens to move in the radial direction of the information carrier, that is, in the direction perpendicular to the track.

A search for a desired information track is carried out by deactivating the tracking control, shifting an optical head including the tracking actuator as a whole in the radial direction of the information carrier, and counting tracks which were crossed by a convergent point of an optical beam on the information carrier. Here, when the number of tracks to the desired information track is several tracks, in order to reach the desired information track surely and stably, an accelerating/decelerating pulse is applied to the tracking actuator while retaining the tracking control in the activated state, and a track jumping of moving to the neighboring track is performed repeatedly.

In recent years, along with the improvement of high-density optical disc technology, a recordable optical disc (DVD-RAM) has come into being. This recordable DVD-RAM disc includes an address part and a recordable data part. Furthermore, this DVD-RAM disc is divided into a plurality of zones in the radial direction, and the data part is formed as a convex groove (referred to as a groove track) and a guide groove of a region interposed between adjacent grooves (referred to as a land track). FIGS. 12A, 12B and 12C are schematic diagrams showing the structure of such an optical disc. FIG. 12A is a partial cutaway perspective view showing the whole structure of an optical disc; FIG. 12B is a perspective view showing an enlarged cross-section of an optical disc 101 cut in the radial direction; and FIG. 12C is a schematic diagram showing the relative position between an address part and a data part. As shown in FIG. 12C, the data part is formed as one spiral structure with grooves and a land, and the address part is formed between the grooves/lands. A convergent point of an optical beam on the optical disc 101 is larger than a track width, and when the convergent point of the optical beam scans the grooves or the lands, address information stored in the address part between these tracks also can be read out.

In the following, a conventional track jumping method for this DVD-RAM disc will be explained in detail with reference to the drawings. FIG. 11 is a block diagram showing a simple configuration of an optical disc device for performing a conventional track jumping method. A conventional optical disc device is provided with a disc motor 102 for rotating the optical disc 101 at a predetermined number of revolutions, an optical head 103 (including a light source such as a semiconductor laser, a coupling lens, a deflected beam splitter, a deflection plate, a converging lens, a condensing lens, a split mirror, a photodetector and so on, which are not shown in the drawing) for reproduction of information from the optical disc 101, and a traverse motor (not shown in the drawing) for shifting the optical head 103 as a whole in a direction perpendicular to the direction of tracks of the optical disc 101.

An optical beam spot formed by the optical head 103 is emitted to the optical disc 101 that is rotated by the disc motor 102. A light reflected from the optical disc 101 passes through a converging lens, a deflection plate, a deflected beam splitter, and a condensing lens and is split into two-way optical beams by a split mirror. One of the split optical beams is input to a focus control device (not shown in the drawing) via a split-structure photodetector to generate a positional displacement signal (a focus error signal, hereinafter abbreviated as a "FE signal") between the convergent point of the optical beam and the optical disc 101 based on a difference in the output of the photodetector, and performs a focus control based on this FE signal so that the convergent point is positioned on the optical disc 101. The configuration and the operation of the focus control device is not directly related to the explanation of the track jumping method, so that the explanation thereof is omitted.

On the other hand, the other optical beam that was split by the split mirror is input to a tracking control device via the split-structure photodetector. The tracking control device includes a tracking error signal generator 104, a digital signal processor (DSP) 1101, a tracking driving circuit 110 and a tracking actuator (not shown in the drawing). The tracking error signal generator 104 generates a signal indicating a displacement of the convergent point of the optical beam on the optical disc 101 with the track, that is, a tracking displacement signal (tracking error signal, hereinafter abbreviated as a "TE signal") for controlling the convergent point of the optical beam on the optical disc 101 in order to scan the surface of the track based on a difference in the output of the split-structure photodetector, and this TE signal is input to the DSP 1101. A method for detecting this TE signal is called "a push-pull method".

A switch 108 is provided in the DSP 1101. The switch 108 is set at a position shown by the solid line when a tracking control is switched on, whereas the switch 108 is set at a position shown by the dotted line when a track jumping to a neighboring track is performed. Therefore, the switch 108 is operated to open and close the loop of a tracking control system and also to switch a driving signal to be supplied to the tracking actuator for performing a tracking control and for performing a track jumping.

First, a tracking control will be explained. The TE signal input to the DSP 1101 is converted from an analog signal to a digital signal by an AD converter 105 and input to a compensating filter 106, which is a digital filter including an adder, a multiplier and a delay element. The compensating filter 106 serves to compensate a phase or the like of the tracking control system. The TE signal whose phase was compensated by the compensating filter 106 is input to the switch 108 via a gain switching circuit 107 that switches a loop gain of the tracking control system. The switch 108 is set at a position shown by the solid line for performing a tracking control, so that the TE signal that passed through the switch 108 is converted from a digital signal to an analog signal by a DA converter 109 and input to the tracking driving circuit 110.

The tracking driving circuit 110 drives the tracking actuator by appropriately performing a current amplification and a level conversion of an output signal from the DSP 1101. Thus, the tracking actuator is driven such that the convergent point of the optical beam on the optical disc 101 scans a predetermined surface of the track, thereby achieving a tracking control. Here, in the case of a DVD-RAM disc, a tracking control is achieved by switching the polarity of the TE signal in the AD converter 105 between a time a tracking control is switched on in a groove of a convex portion and a time a tracking control is switched on in a land of a concave portion.

In accordance therewith, a transfer control is performed, which is to drive the traverse motor such that, when the convergent point of the optical beam on the optical disc 101 scans the surface of the track, the convergent point of the optical beam is matched with the center of the converging lens, that is, an optical axis of the optical beam focused and emitted to the optical disc 101 is matched with an optical axis of the converging lens. However, the explanation thereof is omitted.

Next, a track jumping in a DVD-RAM disc will be explained with reference to the waveform charts of FIG. 13 in addition to the block diagram of FIG. 11. FIGS. 13A, 13B and 13C are waveform charts of a TE signal, an address gate signal and a tracking driving signal at the time a track jumping (one line jumping) is performed from a land to a land in an inner circumferential direction. When a track jumping is performed in an outer circumferential direction, only the polarity of the TE signal and that of the tracking driving signal are reversed, so that the waveform charts and explanations thereof are omitted. Furthermore, when a track jumping is performed from a groove to a groove in an inner circumferential direction, only the polarity of the TE signal is reversed, so that the waveform charts and explanations thereof also are omitted.

As is clear from the block diagram of FIG. 11, when a track jumping is performed, the tracking actuator is driven by a sum signal of a signal that passed through the gain switching circuit 107 and a low-pass filter 112, and an accelerating/decelerating pulse signal generated in an accelerating/decelerating pulse generator 113. Here, a cutoff frequency of the low-pass filter 112 is set to be low to an extent to which an eccentric component of the optical disc 101 passes sufficiently, and a low-frequency component (eccentric component) of the TE signal is added to the accelerating/decelerating pulse signal for driving the tracking actuator, so that the tracking jumping becomes less unstable due to eccentricity of the optical disc 101.

The address part of a DVD-RAM disc is located in an offtrack position between the grooves/lands, as shown in FIG. 12C. In addition, due to the configuration in which one address part consists of an address part 1 that is located in an offtrack position in the inner circumferential direction and an address part 2 that is located in an offtrack position in the outer circumferential direction of the disc, when a convergent point of an optical beam passes through the address part, a sine wave shaped waveform occurs in the TE signal, as shown in FIG. 13A. An address part detection circuit 115 generates a signal that becomes high in the address part (address gate signal), as shown in FIG. 13B. The accelerating/decelerating pulse generator 113 detects a trailing edge of the address gate signal, then waits for a predetermined time (Twait), sets the switch 108 to a position for track jumping shown by the dotted line and starts to output an accelerating pulse (predetermined peak value A1). Thus, the optical head 103 starts to move toward the inner circumferential direction of the optical disc 101, and along with this movement, a sine wave TE signal occurs. After the accelerating pulse is output for a predetermined time (T1), it is in a wait state until a zero-cross-point of the TE signal is detected. Here, the detection of the zero-cross-point is performed by detecting an intersection point of the TE signal that passed through the gain switching circuit 107 with an output signal of the low-pass filter 112. Next, the accelerating/decelerating pulse generator 113 starts to output a decelerating pulse (predetermined peak value A2), and the decelerating pulse is output for a predetermined time (T2). Thereafter, by setting the switch 108 to a position for a tracking control shown by the solid line, the track jumping from a land to a land in the inner circumferential direction is completed. Then, a tracking control is resumed.

Here, a method employed to carry out a rotational control of the disc motor 102 at the time a DVD-RAM disc is reproduced is a method in which a number of revolutions, which is the same in the same zone, is reduced gradually from the inner circumference to the outer circumference (ZCLV method). According to this method, a time-interval from an address part to the next address part always becomes a constant time (about 1.5 ms for a standard-speed reproduction).

According to the configuration of the conventional optical disc described above, when a track jumping is performed, the optical disc device detects the trailing edge of an address gate signal, then waits for a predetermined time, and starts to output an accelerating pulse. However, when the time interval between an address part and the next address part becomes too short due to a high-speed reproduction or immediately after accessing an outer circumference from an inner circumference in a device with a disc motor having a slow response, an output of a decelerating pulse for a track jumping is completed immediately before the next address part, so that a tracking control may be resumed. At this time, a diffracted light from the address part causes a disturbance in the tracking control system, and due to the influence thereof, the tracking control becomes unlocked. Therefore, there was a problem of failing to carry out a track jumping.

SUMMARY OF THE INVENTION

It is an object of the present invention to solve the above-mentioned conventional problems by providing an optical disc device exhibiting stable track jumping performance, in which a reproduction speed is detected at a time a track jumping starts, and when the reproduction speed is faster than a predetermined reproduction speed, a start position of jumping is switched in order to match the application timing of an accelerating pulse or a decelerating pulse for a track jumping with the transit timing in an address part.

In order to achieve the above-mentioned object, an optical disc device according to the present invention includes shifting means for shifting a convergent point of an optical beam focused on an information carrier in which an information track is divided in a radial direction and has an address part in a direction crossing the track on the information carrier, track displacement detection means for generating a signal corresponding to a relative position between the convergent point of the optical beam and the track, tracking control means for driving the shifting means according to an output signal from the track displacement detection means and controlling the convergent point of the optical beam to scan a surface of the track, track jumping means for shifting the convergent point of the optical beam from an arbitrary track to another track on the information carrier, jumping starting means for operating the track jumping means and starting an application of an accelerating signal, and reproduction speed measuring means for measuring a speed at which information on the information carrier is read out, wherein the jumping starting means operates the track jumping means based on a position of the address part on the information carrier and a measuring result from the reproduction speed measuring means.

In a first configuration of an optical disc device according to the present invention, it is preferable that the reproduction speed measuring means includes address part detection means for detecting an address part on the information carrier and address space measuring means for measuring a time interval between two or more consecutive address parts based on an output signal of the address part detection means, and that a reproduction speed is measured by comparing a measuring result from the address space measuring means with a predetermined time. Based on a measuring result from the reproduction speed measuring means, the jumping starting means operates the track jumping means by starting an application of an accelerating signal after the address part is detected and the predetermined time has passed thereafter.

In this case, it is preferable that the address part detection means includes binarization means for converting an output signal from the track displacement detection means or a signal for reproduction of information on the information carrier into two values at a predetermined level in order to detect the address part on the information carrier.

Furthermore, it is preferable that the optical disc device includes reproduction speed comparative means for comparing the reproduction speed measured by the reproduction speed measuring means with a predetermined reproduction speed, wherein when the measured reproduction speed is found to be faster than the predetermined reproduction speed as a result of comparison by the reproduction speed comparative means, the jumping starting means operates the track jumping means by starting an application of an accelerating signal such that an application timing of the accelerating signal or a decelerating signal is matched with a transit timing in the address part.

In this case, it is preferable that the optical disc device includes address part transit time measuring means for measuring a time at which a convergent point of an optical beam passes through the address part, wherein an application time of the accelerating signal or the decelerating signal from the track jumping means is set to be longer than a time measured by the address part transit time measuring means.

Furthermore, it is preferable that the track jumping means includes first track jumping means for shifting a convergent point of an optical beam from an arbitrary track to another neighboring track and second track jumping means for shifting a convergent point of an optical beam to another neighboring track by skipping one track therebetween, and the jumping starting means switches a time interval from the detection of the address part to the operation of the track jumping means between a time the first track jumping means is operated and a time the second track jumping means is operated.

Furthermore, it is preferable that the optical disc device includes reproduction speed comparative means for comparing the reproduction speed measured by the reproduction speed measuring means with a predetermined reproduction speed, wherein when the measured reproduction speed is found to be slower than the predetermined reproduction speed as a result of comparison by the reproduction speed comparative means, the jumping starting means operates the track jumping means in an intermediate position between consecutive address parts.

Alternatively, in a second configuration of an optical disc device according to the present invention, it is preferable that the reproduction speed measuring means includes address part detection means for detecting an address part on the information carrier and address part transit time measuring means for measuring a time at which a convergent point of an optical beam passes through the address part, and that a reproduction speed is measured by comparing a measuring result from the address part transit time measuring means with a predetermined time. Based on a measuring result from the reproduction speed measuring means, the jumping starting means operates the track jumping means by starting an application of an accelerating signal after the address part is detected and the predetermined time has passed thereafter. The above-mentioned first configuration requires a time for at least two addresses for calculation of the reproduction speed in order to measure a time from a certain address part to the next address part, whereas this second configuration can reduce the time required for calculation of the reproduction speed since a transit time in the address part itself is measured, so that a track jumping can be started earlier.

In this case, it is preferable that the address part detection means includes binarization means for converting an output signal from the track displacement detection means or a signal for reproduction of information on the information carrier into two values at a predetermined level in order to detect the address part on the information carrier.

Furthermore, it is preferable that the optical disc device includes reproduction speed comparative means for comparing the reproduction speed measured by the reproduction speed measuring means with a predetermined reproduction speed, wherein when the measured reproduction speed is found to be faster than the predetermined reproduction speed as a result of comparison by the reproduction speed comparative means, the jumping starting means operates the track jumping means by starting the application of an accelerating signal such that an application timing of an accelerating signal or a decelerating signal is matched with a transit timing in the address part.

In this case, it is preferable that the application time of the accelerating signal or the decelerating signal by the track jumping means is set to be longer than a time measured by the address part transit time measuring means.

Furthermore, it is preferable that the track jumping means includes first track jumping means for shifting a convergent point of an optical beam from an arbitrary track to another neighboring track and second track jumping means for shifting a convergent point of an optical beam to another neighboring track by skipping one track therebetween, and the jumping starting means switches a time interval from the detection of the address part to the operation of the track jumping means between a time the first track jumping means is operated and a time the second track jumping means is operated.

Furthermore, it is preferable that the optical disc device includes reproduction speed comparative means for comparing the reproduction speed measured by the reproduction speed measuring means with a predetermined reproduction speed, wherein when the measured reproduction speed is found to be slower than the predetermined reproduction speed as a result of comparison by the reproduction speed comparative means, the jumping starting means operates the track jumping means in an intermediate position between consecutive address parts.

Alternatively, in a third configuration of an optical disc device according to the present invention, it is preferable that the reproduction speed measuring means includes address part detection means for detecting an address part on the information carrier, reproduction signal detection means for generating a signal for reproduction of information on the information carrier by a reflected light or a transmission light from the information carrier, address readout means for reading out address information in the address part obtained by an output signal from the reproduction signal detection means, radial position calculation means for calculating a radial position of a convergent point of an optical beam on the information carrier based on the address information from the address readout means, and rotation number measuring means for measuring the number of revolutions of the rotating information carrier. Based on a measuring result from the reproduction speed measuring means, the jumping starting means operates the track jumping means by starting an application of an accelerating signal after the address part is detected and a predetermined time has passed thereafter.

In this case, it is preferable that the optical disc device includes reproduction speed comparative means for comparing the reproduction speed measured by the reproduction speed measuring means with a predetermined reproduction speed, wherein when the measured reproduction speed is found to be faster than the predetermined reproduction speed as a result of comparison by the reproduction speed comparative means, the jumping starting means operates the track jumping means by starting an application of an accelerating signal such that an application timing of an accelerating signal or a decelerating signal is matched with a transit timing in the address part.

Furthermore, it is preferable that the optical disc device includes address part transit time measuring means for measuring a time at which a convergent point of an optical beam passes through the address part, and an application time of the accelerating signal or the decelerating signal from the track jumping means is set to be longer than a time measured by the address part transit time measuring means.

Furthermore, it is preferable that the track jumping means includes first track jumping means for shifting a convergent point of an optical beam from an arbitrary track to another neighboring track and second track jumping means for shifting a convergent point of an optical beam to another neighboring track by skipping one track therebetween, and the jumping starting means switches a time interval from the detection of the address part to the operation of the track jumping means between a time the first track jumping means is operated and a time the second track jumping means is operated.

Furthermore, it is preferable that the optical disc device includes reproduction speed comparative means for comparing the reproduction speed measured by the reproduction speed measuring means with a predetermined reproduction speed, wherein when the measured reproduction speed is found to be slower than the predetermined reproduction speed as a result of comparison by the reproduction speed comparative means, the jumping starting means operates the track jumping means in an intermediate position between consecutive address parts.

DESCRIPTION OF THE PREFERRED EMBODIMENTS

Hereinafter, preferred embodiments of the present invention will be described in detail with reference to the drawings.

First Embodiment

Figure 1:
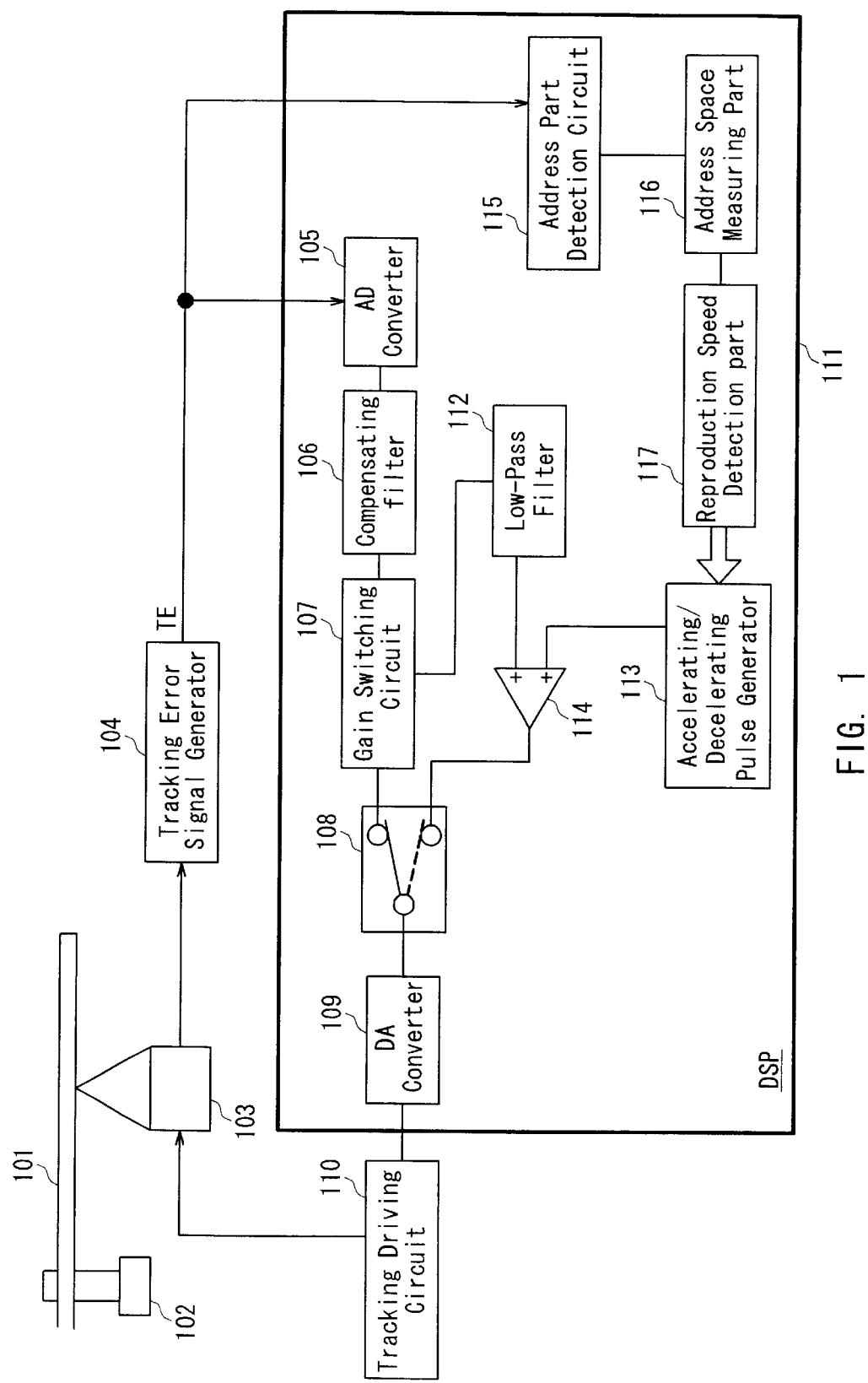
FIG. 1 is a block diagram showing the configuration of an optical disc device according to a first embodiment of the present invention.
Figure 11:
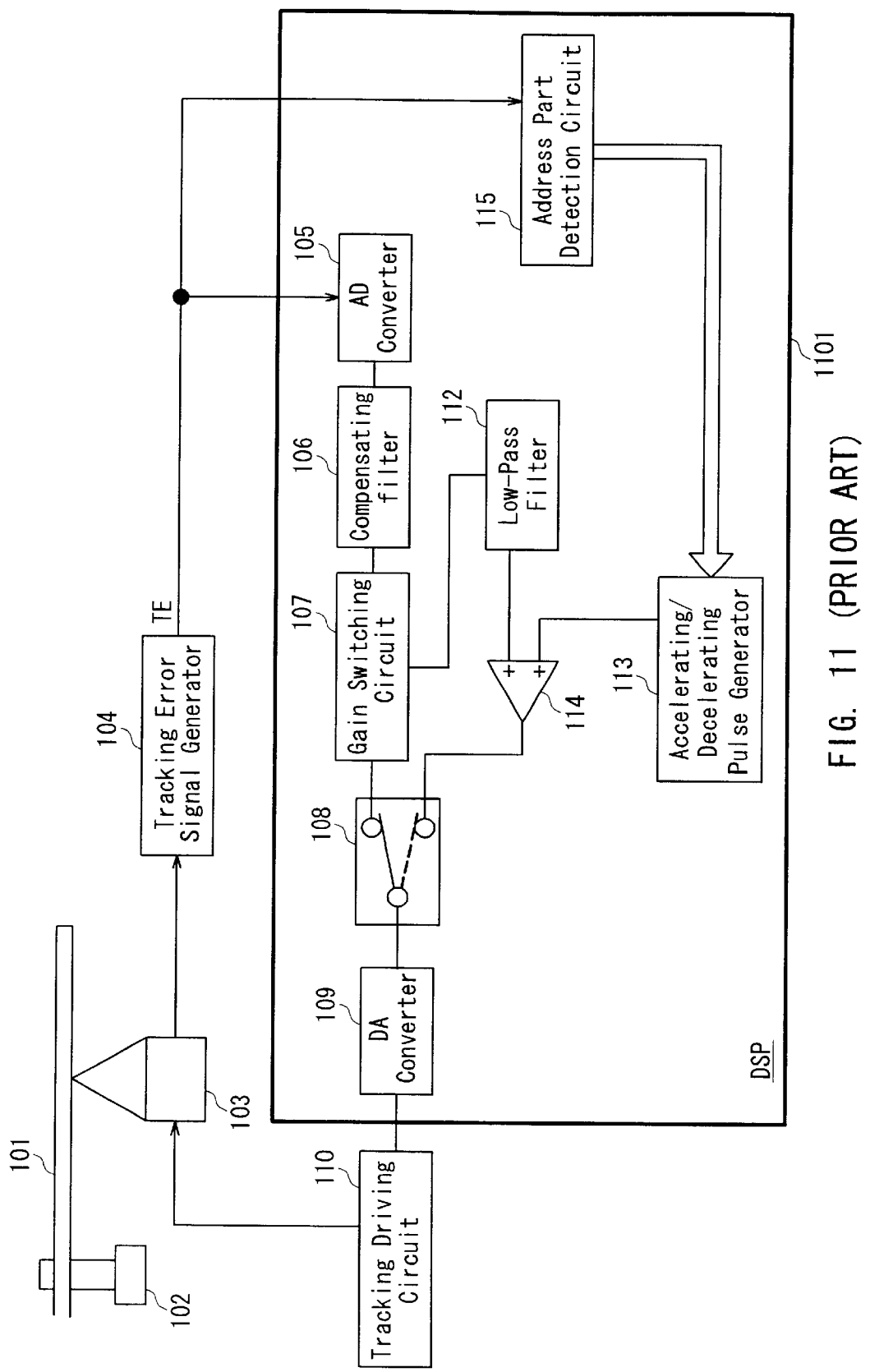
FIG. 11 is a block diagram showing the configuration of an optical disc device for performing a conventional track jumping method.

FIG. 1 is a block diagram showing the configuration of an optical disc device according to a first embodiment of the present invention. A track jumping method for the optical disc device in the present embodiment is performed by adding an address space measuring part 116 and a reproduction speed detection part 117 to the block diagram of FIG. 11 showing a conventional track jumping method. Here, elements corresponding to those already described in the conventional method have been given the same reference numerals, and the explanations thereof are omitted here.

According to the configuration of this optical disc device, an output signal (address gate signal) of an address part detection circuit 115 is input to the address space measuring part 116, and based on the measuring result from the address space measuring part 116, a reproduction speed is detected in the reproduction speed detection part 117. Then, based on the result of this detection, an application timing of an accelerating pulse is switched in an accelerating/decelerating pulse generator 113.

In the following, a track jumping process in the present embodiment will be explained in detail with reference to the waveform charts of FIG. 2 and FIG. 3 in addition to the block diagram of FIG. 1. FIGS. 2A, 2B, 2C and 2D are waveform charts for the explanation of an address gate signal generation method in the address part detection circuit 115, respectively showing a TE signal, an inner circumferential address position signal that becomes a logic high when a TE signal exceeds a predetermined value, an outer circumferential address position signal that becomes a logic high when a TE signal to the contrary is below a predetermined value and an address gate signal.

Figure 2A:
FIG. 2A is a waveform chart of a TE signal for explanation of an address part detection method in the first embodiment.
Figure 2B:
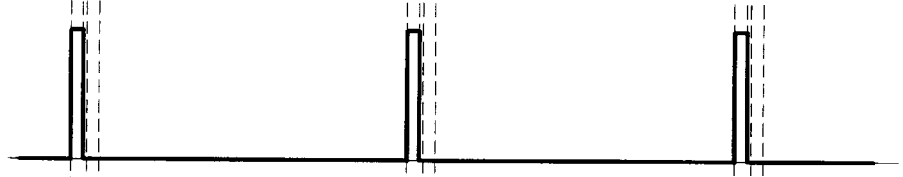
FIG. 2B is a waveform chart of an inner circumferential address position signal for explanation of an address part detection method in the first embodiment.
Figure 2C:
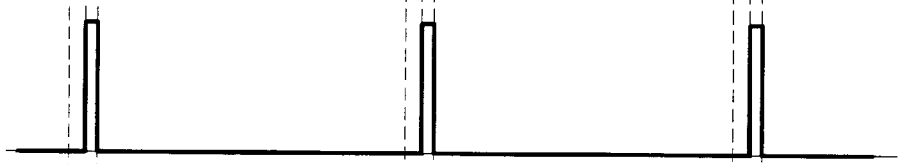
FIG. 2C is a waveform chart of an outer circumferential address position signal for explanation of an address part detection method in the first embodiment.
Figure 2D:
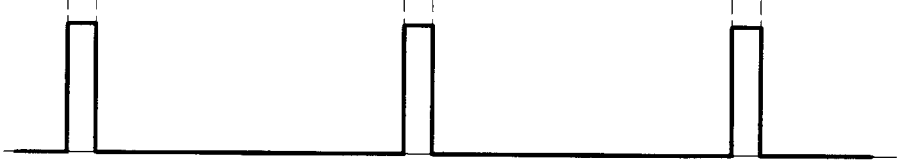
FIG. 2D is a waveform chart of an address gate signal for explanation of an address part detection method in the first embodiment.
Figure 12A:
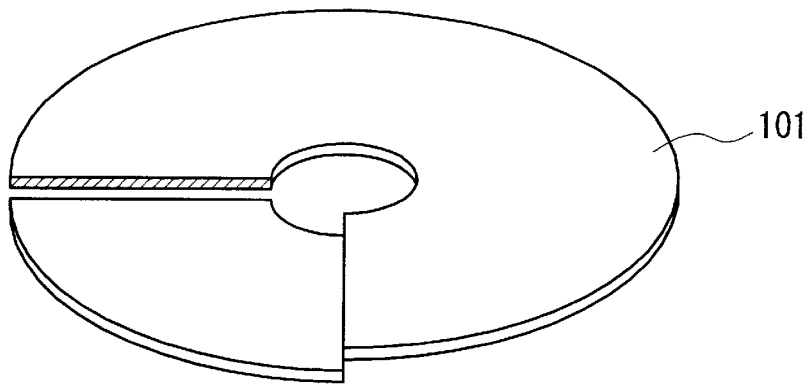
FIG. 12A is a partial cutaway perspective view showing the whole structure of a DVD-RAM disc.
Figure 12B:
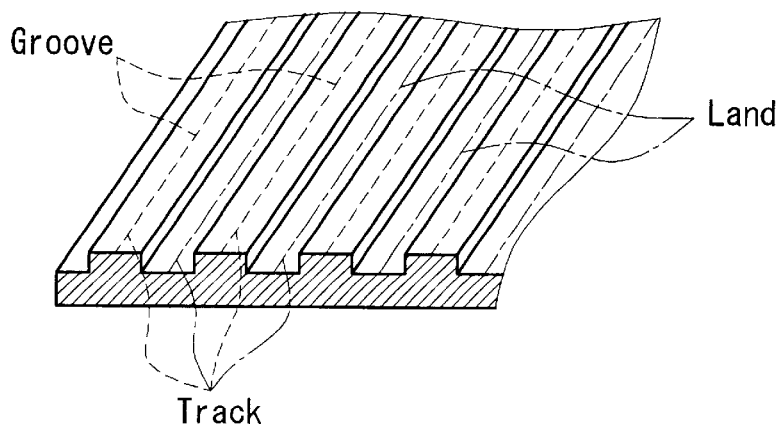
FIG. 12B is a perspective view showing an enlarged cross-section of a DVD-RAM disc cut in the radial direction.
Figure 12C:
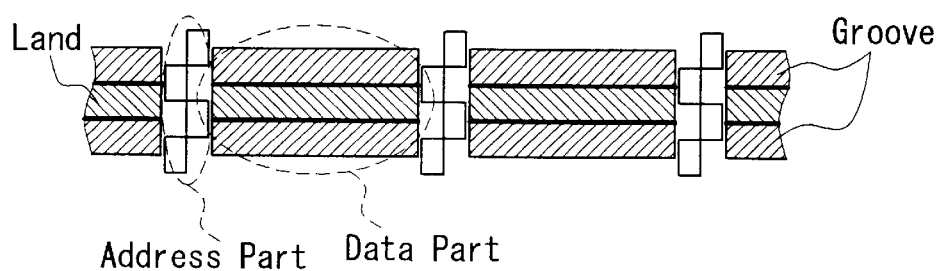
FIG. 12C is a schematic diagram showing the relative position between an address part and a data part.
Figure 13A:
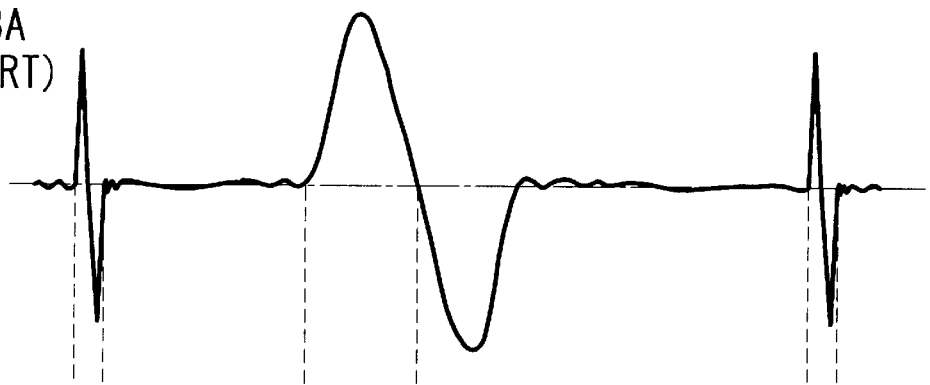
FIG. 13A is a waveform chart of a TE signal for explanation of a conventional track jumping method.
Figure 13B:
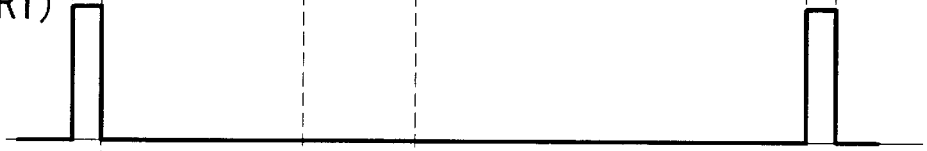
FIG. 13B is a waveform chart of an address gate signal for explanation of a conventional track jumping method.
Figure 13C:
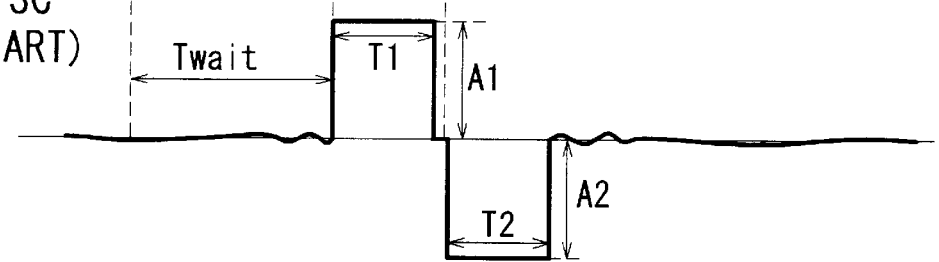
FIG. 13C is a waveform chart of a tracking driving signal for explanation of a conventional track jumping method.

An address part is located in an offtrack position as shown in FIG. 12C, and therefore, when a convergent point of an optical beam passes through the address part, a sine wave waveform occurs as a TE signal, as shown in FIG. 2A. As shown in FIGS. 2B and 2C, a predetermined positive and negative level L1 is set with respect to a tracking control position. When the TE signal exceeds the level L1, the inner circumferential address position signal becomes a logic high, whereas the outer circumferential address position signal becomes a logic high when the TE signal is below the level −L1. Here, for example, when a tracking control is switched on in a land, a place where the inner circumferential address position signal has become a logic high is an address part located in an offtrack position in the inner circumferential direction, and a place where the outer circumferential address position signal has become a logic high is an address part located in an offtrack position in the outer circumferential direction. The address gate signal shown in FIG. 2D is a signal that becomes a logic high when either one of the inner circumferential address position signal and the outer circumferential address position signal becomes a logic high, which is a signal for detection of an address part.

The address gate signal detected in the address part detection circuit 115 is input to the address space measuring part 116, and a time interval of the address gate signal from a trailing edge to the next trailing edge (address space time Ta) is measured in the address space measuring part 116. The reproduction speed detection part 117 compares the measured address space time Ta with an address space time for a standard-speed reproduction (about 1.5 ms) and detects the present reproduction speed. For example, when the measured address space time Ta is 1 ms, the reproduction speed will be 1.5 times faster.

Figure 3A:
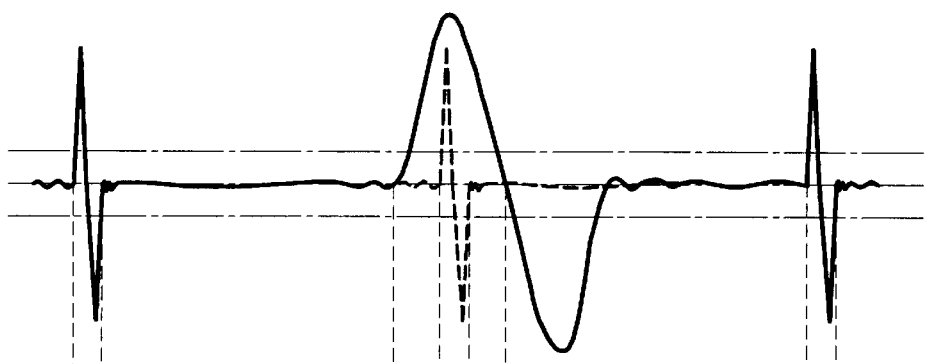
FIG. 3A is a waveform chart of a TE signal for explanation of a track jumping method based on an accelerating pulse in the first embodiment.
Figure 3B:
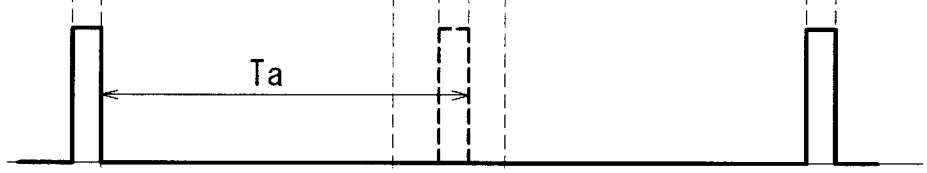
FIG. 3B is a waveform chart of an address gate signal for explanation of a track jumping method based on an accelerating pulse in the first embodiment.
Figure 3C:
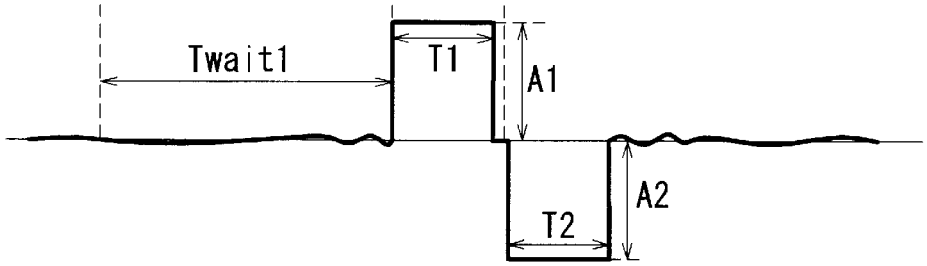
FIG. 3C is a waveform chart of a tracking driving signal for explanation of a track jumping method based on an accelerating pulse in the first embodiment.

Next, a method for determining an actual start timing of a track jumping will be explained from the reproduction speed detected in the reproduction speed detection part 117. FIGS. 3A, 3B and 3C respectively are waveform charts of a TE signal, an address gate signal and a tracking driving signal at a time a track jumping (one line jumping) is performed from a land to a land in an inner circumferential direction. In addition, when a track jumping is performed in an outer circumferential direction, only the polarity of the TE signal and that of the tracking driving signal are reversed, so that the waveform charts and explanations thereof are omitted. Furthermore, when a track jumping is performed from a groove to a groove in an inner circumferential direction, only the polarity of the TE signal is reversed, so that the waveform charts and explanations thereof are omitted.

The time required for a track jumping (accelerating pulse application time T1+decelerating pulse application time T2 (T1≈T2)) is set to be about 300 us, and a wait time is set (about 600 us) such that a track jumping starts approximately in an intermediate position between an address part being reproduced at a standard speed and the next address part. In this case, when the reproduction speed becomes about 1.6 times faster, the next address part is reached immediately after the track jumping is completed. At this time, a diffracted light from the address part may cause a disturbance in the tracking control system, and due to the influence thereof, the tracking jumping may result in failure. When the reproduction speed detected in the reproduction speed detection part 117 is slower than the predetermined reproduction speed (about 1.6 times faster), an accelerating/decelerating pulse is generated in the accelerating/decelerating pulse generator 113 so that it is in a wait state for a fixed time and a track jumping starts thereafter as conventionally.

On the other hand, when the detected reproduction speed is faster than the predetermined reproduction speed, as shown in FIG. 3C, an accelerating pulse or a decelerating pulse is generated in the accelerating/decelerating pulse generator 113 so that it is in a wait state only for a time calculated by subtracting a predetermined time from the measured address space time Ta (Twait 1) and a track jumping starts thereafter. Here, the application time T1 of the accelerating pulse is set to be longer than the address part transit time for a standard-speed reproduction, and the predetermined time to be subtracted from the address space time Ta is set to be a value that is longer than the address part transit time for a standard-speed reproduction and also shorter than the accelerating pulse application time. Accordingly, the application timing of the accelerating pulse is matched with the transit timing in the address part.

Furthermore, a track jumping (half jumping) from a land to a groove or from a groove to a land is achieved by setting the peak values A1, A2 of the accelerating and decelerating pulses to be the same as for one line jumping and the application times T1, T2 of the accelerating and decelerating pulses to be shorter than those for one line jumping. When a half jumping is performed, a predetermined time to be subtracted from the measured address space time Ta is set to be shorter only by a ratio of the application time T1 of the accelerating pulse, so that the application timing of the accelerating pulse is matched with the transit timing in the address part also at the time of half jumping.

As described above, a start timing of a track jumping is varied depending on a measured reproduction speed, and when the reproduction speed is faster than a predetermined reproduction speed, an application timing of an accelerating pulse is matched with a transit timing in an address part. Thus, a stable track jumping can be achieved.

Figure 4A:
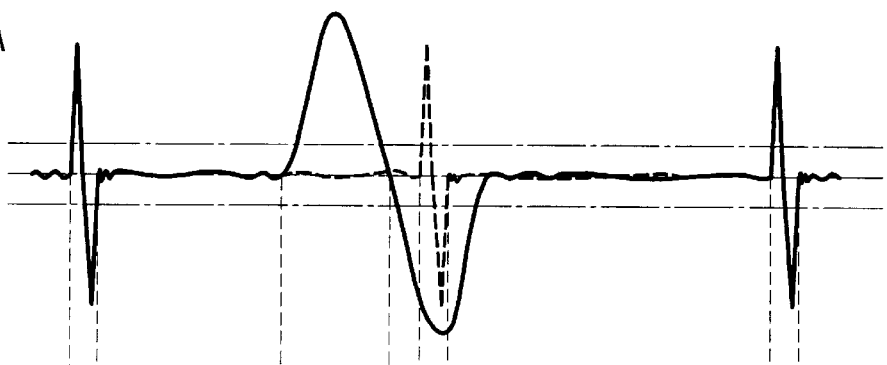
FIG. 4A is a waveform chart of a TE signal for explanation of a track jumping method based on a decelerating pulse in the first embodiment.
Figure 4B:
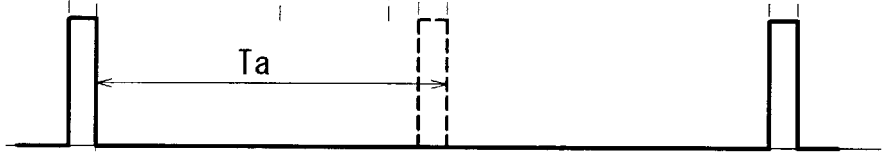
FIG. 4B is a waveform chart of an address gate signal for explanation of a track jumping method based on a decelerating pulse in the first embodiment.
Figure 4C:
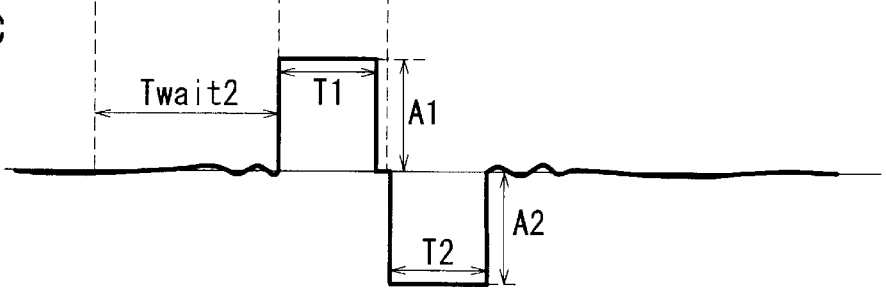
FIG. 4C is a waveform chart of a tracking driving signal for explanation of a track jumping method based on a decelerating pulse in the first embodiment.

In addition, according to the configuration of the present embodiment, a start position of jumping is switched in order to match the application timing of an accelerating pulse for a track jumping with the transit timing in an address part. However, as shown in FIGS. 4A, 4B and 4C corresponding to FIGS. 3A, 3B and 3C respectively, the same effect can be obtained also in the configuration in which a start position of jumping is switched in order to match the application timing of a decelerating pulse with the transit timing in an address part.

Second Embodiment

Next, a second embodiment will be explained. An optical disc device of the present embodiment can be achieved, as shown in a block diagram of FIG. 5, by providing an address part transit time measuring part 501 for measuring a transit time in an address part, instead of the address space measuring part 116 in the configuration of the first embodiment shown in FIG. 1 and changing the method for detecting a reproduction speed in the reproduction speed detection part 117 (502). Here, elements corresponding to those already described in the first embodiment have been given the same reference numerals, and the explanations thereof are omitted. 503 denotes a digital signal processor (DSP).

In this optical disc device, an output signal (address gate signal) of an address part detection circuit 115 is input to an address part transit time measuring part 501, and based on the measuring result from the address part transit time measuring part 501, a reproduction speed is detected in the reproduction speed detection part 502. Then, based on the result of this detection, an application timing of an accelerating pulse is switched in an accelerating/decelerating pulse generator 113.

Figure 5:
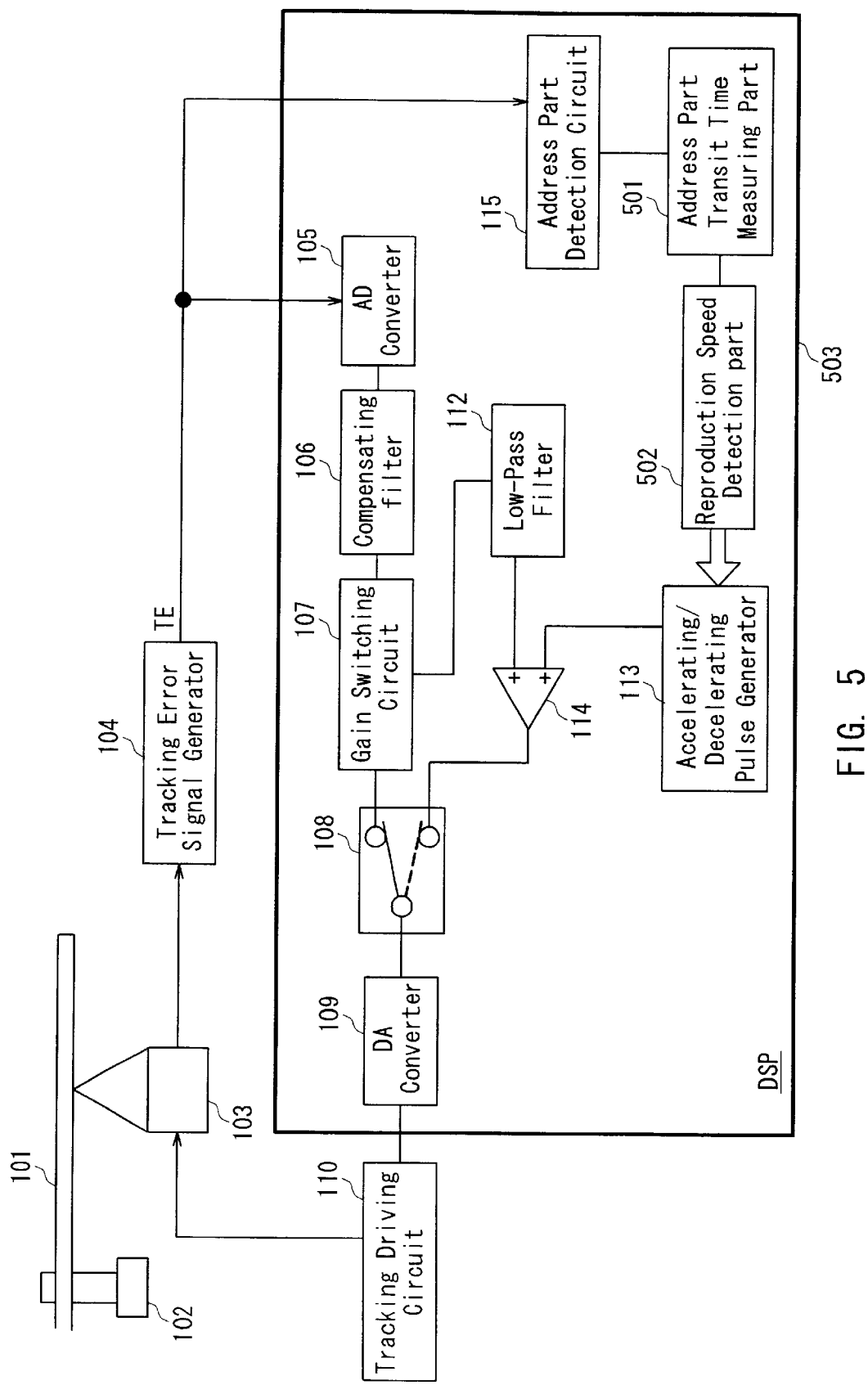
FIG. 5 is a block diagram showing the configuration of an optical disc device according to a second embodiment of the present invention.
Figure 6A:
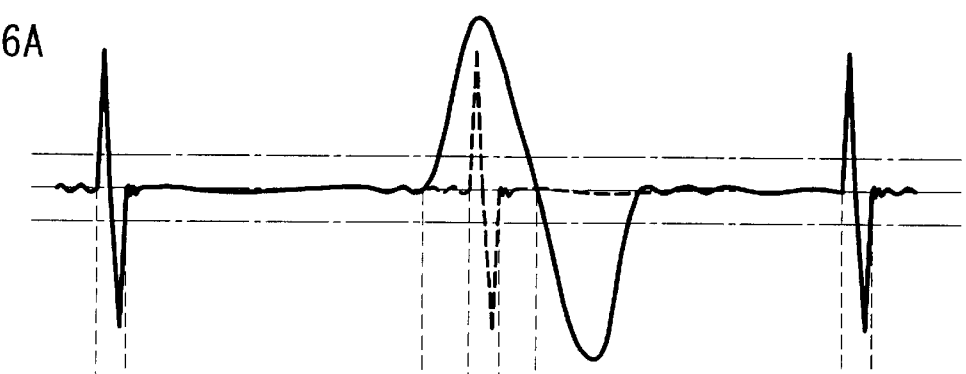
FIG. 6A is a waveform chart of a TE signal for explanation of a track jumping method in the second embodiment.
Figure 6B:
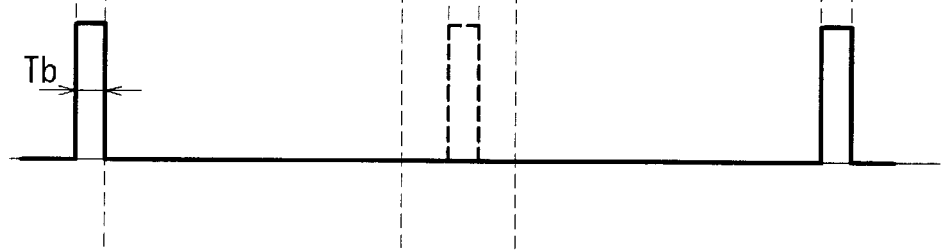
FIG. 6B is a waveform chart of an address gate signal for explanation of a track jumping method in the second embodiment.

In the following, a track jumping process in the present embodiment will be explained in detail with reference to the waveform charts of FIG. 6 in addition to the block diagram of FIG. 5. FIGS. 6A, 6B and 6C respectively are waveform charts of a TE signal, an address gate signal and a tracking driving signal at a time a track jumping (one line jumping) is performed from a land to a land in an inner circumferential direction. In addition, when a track jumping is performed in an outer circumferential direction, only the polarity of the TE signal and that of the tracking driving signal are reversed, so that the waveform charts and explanations thereof are omitted. Furthermore, when a track jumping is performed from a groove to a groove in an inner circumferential direction, only the polarity of the TE signal is reversed, so that the waveform charts and explanations thereof are omitted.

An address gate signal detected in the address part detection circuit 115 is input to the address part transit time measuring part 501, and a time interval of the address gate signal from a rising edge to a trailing edge (address part transit time Tb) is measured in the address part transit time measuring part 501. The reproduction speed detection part 502 compares the measured address part transit time Tb with an address part transit time for a standard-speed reproduction and detects the present reproduction speed.

Figure 6C:
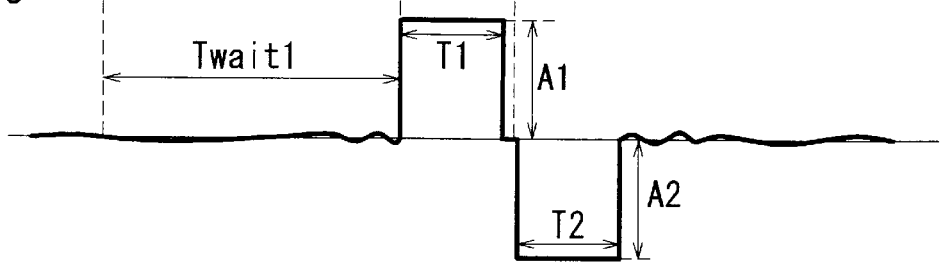
FIG. 6C is a waveform chart of a tracking driving signal for explanation of a track jumping method in the second embodiment.

When the detected reproduction speed is faster than the predetermined reproduction speed (about 1.6 times faster as in the first embodiment), as shown in FIG. 6C, an accelerating pulse or a decelerating pulse is generated in the accelerating/decelerating pulse generator 113 so that it is in a wait state only for a time calculated by multiplying the measured address part transit time Tb by a predetermined coefficient (Twait 1) and a track jumping starts thereafter. Here, as in the first embodiment, the application time Ti of the accelerating pulse is set to be longer than the address part transit time for a standard-speed reproduction, and the predetermined coefficient to be multiplied by the address part transit time Tb is set such that the application timing of the accelerating pulse is matched with the transit timing in the address part.

As described above, a start timing of a track jumping is varied depending on a measured reproduction speed, and when the reproduction speed is faster than a predetermined reproduction speed, an application timing of an accelerating pulse is matched with a transit timing in an address part. Thus, a stable track jumping can be achieved.

In addition, according to the configuration of the present embodiment, a start position of jumping is switched in order to match the application timing of an accelerating pulse for a track jumping with the transit timing in an address part. However, as in the first embodiment, the same effect can be obtained also in the configuration in which a start position of jumping is switched in order to match the application timing of a decelerating pulse with the transit timing in an address part.

Third Embodiment

Next, a third embodiment will be explained. An optical disc device of the present embodiment can be achieved, as shown in a block diagram of FIG. 7, by providing a reproduction signal generator 701 in the configuration of the first embodiment shown in FIG. 1 and changing the method for generating an address gate signal in the address part detection circuit 115 (702). Here, elements corresponding to those already described in the first embodiment have been given the same reference numerals, and the explanations thereof are omitted. 703 denotes a digital signal processor (DSP).

Instead of the TE signal described in the first embodiment or in the second embodiment, a reproduction signal (RF signal), which is generated in the reproduction signal generator 701 by a reflected light or a transmitted light from the optical disc 101, is input to the address part detection circuit 702.

Figure 7:
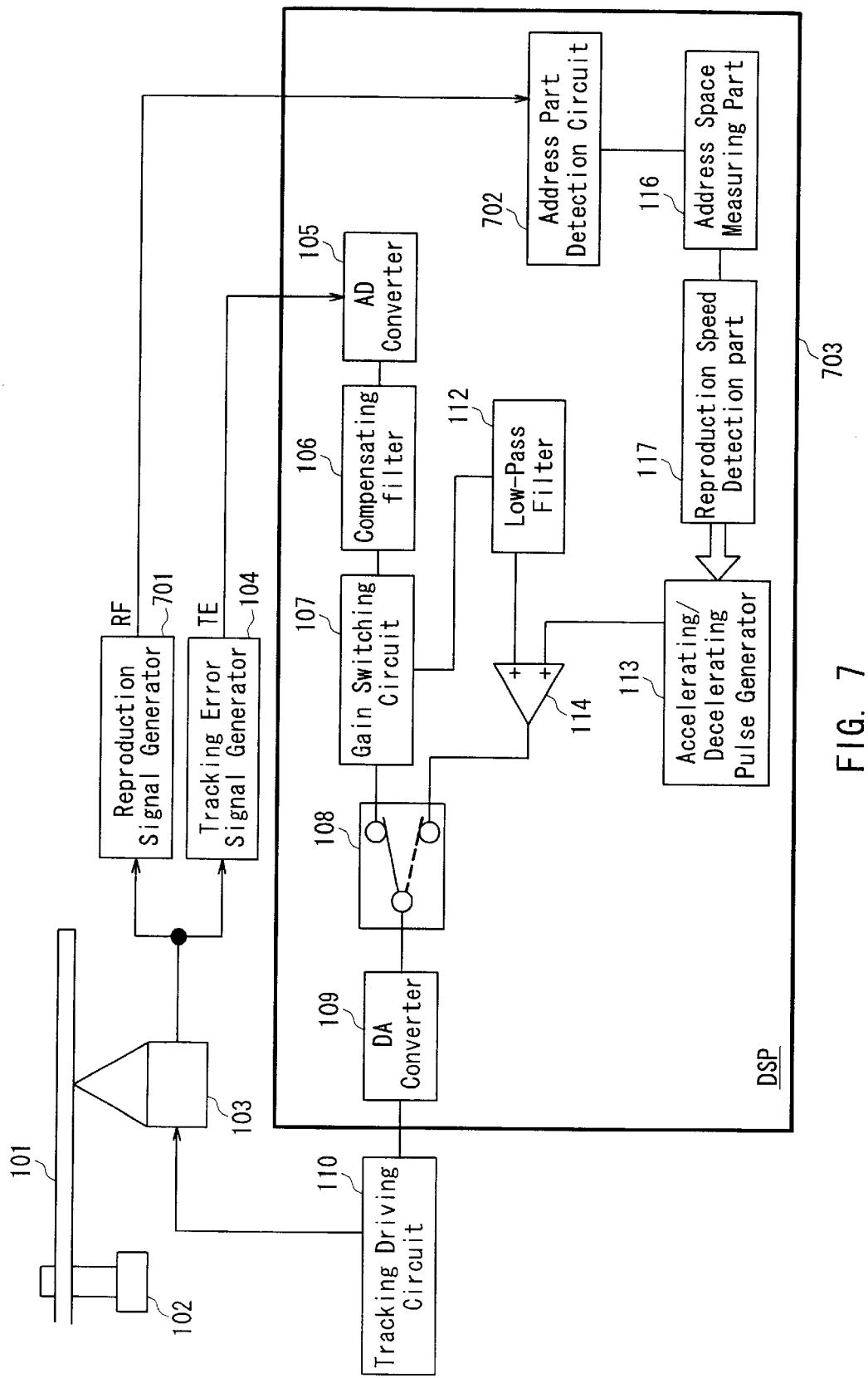
FIG. 7 is a block diagram showing the configuration of an optical disc device according to a third embodiment of the present invention.
Figure 8A:
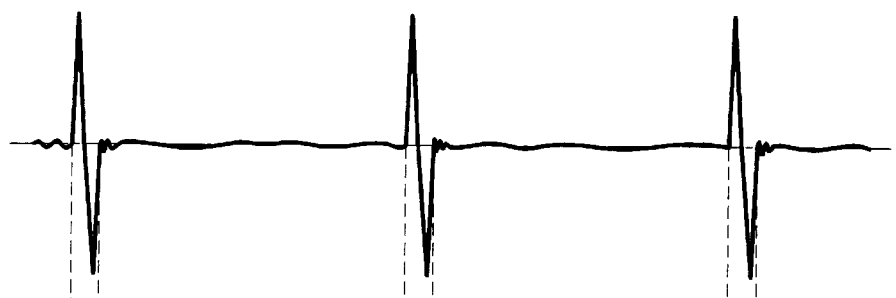
FIG. 8A is a waveform chart of a TE signal for explanation of an address part detection method in the third embodiment.
Figure 8B:
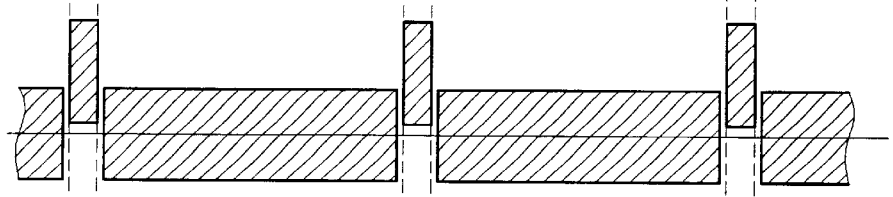
FIG. 8B is a waveform chart of a reproduction signal for explanation of an address part detection method in the third embodiment.
Figure 8C:
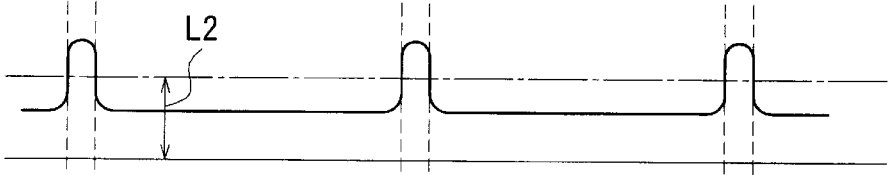
FIG. 8C is a waveform chart of an envelope signal for explanation of an address part detection method in the third embodiment.
Figure 8D:
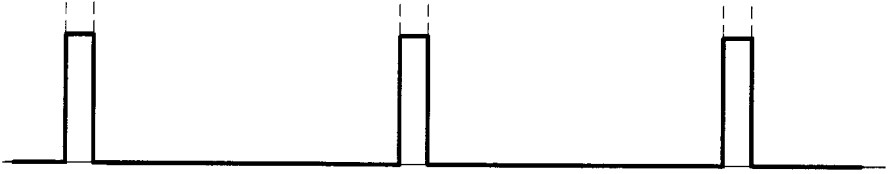
FIG. 8D is waveform chart of an address gate signal for explanation of an address part detection method in the third embodiment.

In the following, an address gate signal generation method in the present embodiment will be explained with reference to the waveform charts of FIG. 8 in addition to the block diagram of FIG. 7. FIGS. 8A, 8B, 8C and 8D are waveform charts for explanation of an address gate generation method in the address part detection circuit 702, respectively showing a TE signal, a reproduction signal (RF signal), an upper envelope signal of a RF signal and an address gate signal. An address part is located in an offtrack position as shown in FIG. 12C, and thus, when a convergent point of an optical beam passes through an address part, as shown in FIG. 8B, a waveform bearing a certain offset compared to a data part appears as a RF signal. A signal in which an upper envelope is extracted from this RF signal is the upper envelope signal shown in FIG. 8C, and with respect to a predetermined level L2, a signal that becomes a logic high when the level L2 is exceeded is the signal for detection of an address part (address gate signal) shown in FIG. 8D. Here, by setting the predetermined level L2 to be a level that is higher than an amplitude of the upper envelope signal in the data part, only the address part can be detected.

Here, except for the method for generating an address gate signal in the address part detection circuit 702, a track jumping process in the present embodiment is the same as the track jumping process described in the first embodiment, so that the explanations thereof are omitted. Also, the same effect as that in the first embodiment can be obtained.

Figure 9:
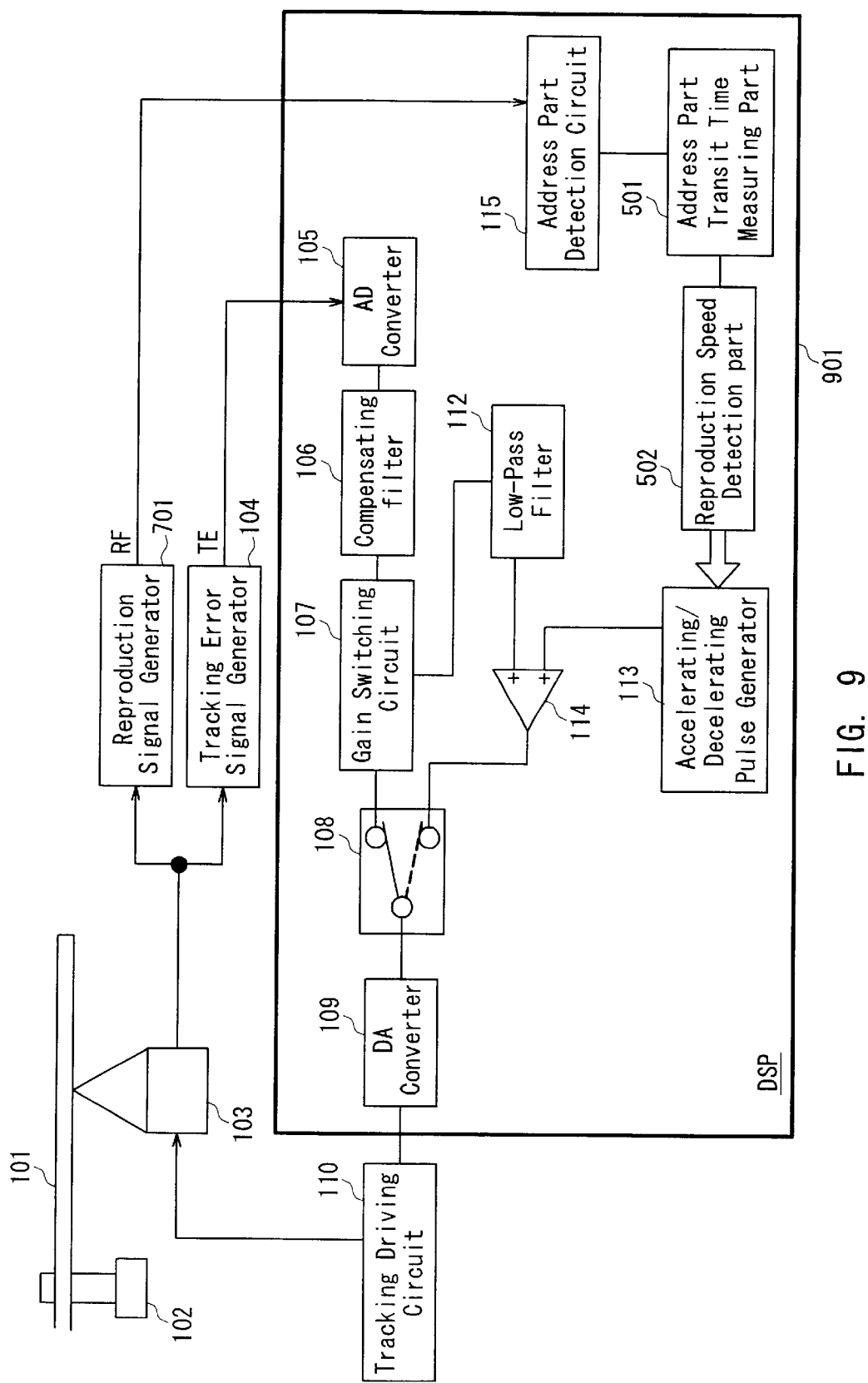
FIG. 9 is a block diagram showing the configuration of an optical disc device having another reproduction speed detection means in the third embodiment.

In addition, as shown in a block diagram of FIG. 9, the same effect can be obtained also in the configuration in which an address part transit time is measured and a reproduction speed is detected based on the measuring result as in the second embodiment. 901 denotes a digital signal processor (DSP).

Fourth Embodiment

Next, a fourth embodiment will be explained. An optical disc device of the present embodiment can be achieved, as shown in a block diagram of FIG. 10, by providing an address readout part 1001 for reading out address information based on a RF signal and a rotation number measuring part 1003 for measuring a number of revolutions of the disc motor 102 based on a FG (Frequency Generation) signal, instead of the address space measuring part 116 in the configuration of the third embodiment shown in FIG. 7 and changing the method for detecting a reproduction speed in the reproduction speed detection part 117 (1002). Here, elements corresponding to those already described in the third embodiment have been given the same reference numerals, and the explanations thereof are omitted. 1004 denotes a digital signal processor (DSP).

According to the configuration of this optical disc device, a reproduction speed is detected in the reproduction speed detection part 1002 based on the address information readout in the address readout part 1001 and the number of revolutions of the disc motor 102 measured in the rotation number measuring part 1003.

Figure 10:
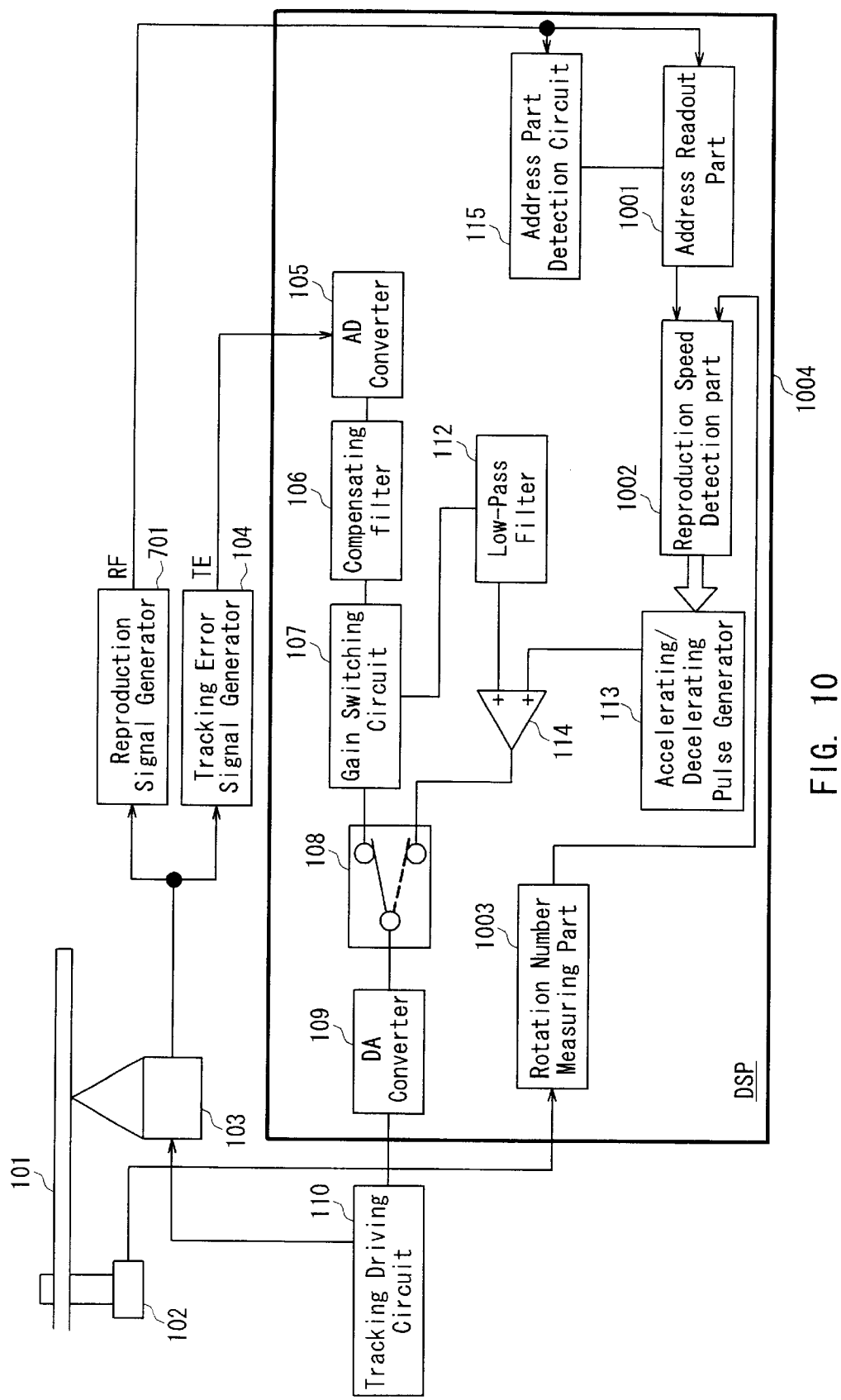
FIG. 10 is a block diagram showing the configuration of an optical disc device according to a fourth embodiment of the present invention.

In the following, a reproduction speed detection method in the present embodiment will be explained in detail with reference to the block diagram of FIG. 10. The FG signal that is output from the disc motor 102 is a binarized signal to be output in a predetermined number (for example, 6) per one rotation of the disc motor, and the number of revolutions of the disc motor 102 can be measured by measuring the cycle of the FG signal (for example, 6 cycles) corresponding to one rotation in the rotation number measuring part 1003. Furthermore, the address readout part 1001 reads out address information by reading out the information in a section in which the address gate signal detected in the address part detection circuit 115 becomes a logic high. The address information that had been read out is input to the reproduction speed detection part 1002, and a radial position and a zone on the optical disc 101 where a convergent point of an optical beam is positioned at present are calculated from the address information. In the ZCLV (Zone Constant Linear Velocity) control, the number of revolutions of the disc motor for each zone is different, and the number of revolutions for a standard-speed reproduction is determined for each zone. Therefore, the present reproduction speed can be detected by comparing the measured number of revolutions of the disc motor 102 with the calculated number of revolutions for a standard-speed reproduction. Furthermore, in the case of controlling the disc motor 102 at a constant angular velocity (CAV reproduction), the disc motor 102 is rotating always at a determined constant number of revolutions, so that it is not necessary to measure the number of revolutions in the rotation number measuring part 1003, and the present reproduction speed can be detected from the number of revolutions for a standard-speed reproduction of a zone calculated from the address information.

Here, a track jumping process in the present embodiment is the same as the track jumping process described in the other embodiments, so that the explanations thereof are omitted. Also, the same effect can be obtained.

In addition, the same effect can be obtained also in the configuration in which an address gate signal is generated from a TE signal as in the first embodiment or the second embodiment.

As described above, according to the present invention, a reproduction speed at a time a track jumping starts is detected, and when the reproduction speed is faster than a predetermined reproduction speed, a start position of jumping is switched in order to match the application timing of an accelerating pulse or a decelerating pulse for a track jumping with the transit timing in an address part. As a result, an optical disc device exhibiting stable track jumping performance can be provided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disc device comprising shifting means for shifting a convergent point of an optical beam focused on an information carrier in which an information track is divided in a radial direction and has an address part in a direction crossing the track on the information carrier, track displacement detection means for generating a signal corresponding to a relative position between the convergent point of the optical beam and the track, tracking control means for driving the shifting means according to an output signal from the track displacement detection means and controlling the convergent point of the optical beam to scan a surface of the track, track jumping means for shifting the convergent point of the optical beam from an arbitrary track to another track on the information carrier, jumping starting means for operating the track jumping means and starting an application of an accelerating signal, and reproduction speed measuring means for measuring a speed at which information on the information carrier is read out, wherein the jumping starting means operates the track jumping means based on a position of the address part on the information carrier and a measuring result from the reproduction speed measuring means.

2. The optical disc device according to claim 1, wherein the reproduction speed measuring means comprises address part detection means for detecting an address part on the information carrier and address space measuring means for measuring a time interval between two or more consecutive address parts based on an output signal of the address part detection means, wherein a reproduction speed is measured by comparing a measuring result from the address space measuring means with a predetermined time, and the jumping starting means operates the track jumping means by starting an application of an accelerating signal after the address part is detected and the predetermined time has passed thereafter, based on a measuring result from the reproduction speed measuring means.

3. The optical disc device according to claim 2, wherein the address part detection means comprises binarization means for converting an output signal from the track displacement detection means or a signal for reproduction of information on the information carrier into two values at a predetermined level in order to detect the address part on the information carrier.

4. The optical disc device according to claim 2, further comprising reproduction speed comparative means for comparing the reproduction speed measured by the reproduction speed measuring means with a predetermined reproduction speed, wherein when the measured reproduction speed is found to be faster than the predetermined reproduction speed as a result of comparison by the reproduction speed comparative means, the jumping starting means operates the track jumping means by starting an application of an accelerating signal such that an application timing of the accelerating signal is matched with a transit timing in the address part.

5. The optical disc device according to claim 4, further comprising address part transit time measuring means for measuring a time at which a convergent point of an optical beam passes through the address part, wherein an application time of the accelerating signal from the track jumping means is set to be longer than a time measured by the address part transit time measuring means.

6. The optical disc device according to claim 2, further comprising reproduction speed comparative means for comparing the reproduction speed measured by the reproduction speed measuring means with a predetermined reproduction speed, wherein when the measured reproduction speed is found to be faster than the predetermined reproduction speed as a result of comparison by the reproduction speed comparative means, the jumping starting means operates the track jumping means by starting an application of an accelerating signal such that an application timing of a decelerating signal is matched with a transit timing in the address part.

7. The optical disc device according to claim 6, further comprising address part transit time measuring means for measuring a time at which a convergent point of an optical beam passes through the address part, wherein an application time of the decelerating signal from the track jumping means is set to be longer than a time measured by the address part transit time measuring means.

8. The optical disc device according to claim 4, wherein the track jumping means comprises first track jumping means for shifting a convergent point of an optical beam from an arbitrary track to another neighboring track and second track jumping means for shifting a convergent point of an optical beam to another neighboring track by skipping one track therebetween, and the jumping starting means switches a time interval from the detection of the address part to the operation of the track jumping means between a time the first track jumping means is operated and a time the second track jumping means is operated.

9. The optical disc device according to claim 2, further comprising reproduction speed comparative means for comparing the reproduction speed measured by the reproduction speed measuring means with a predetermined reproduction speed, wherein when the measured reproduction speed is found to be slower than the predetermined reproduction speed as a result of comparison by the reproduction speed comparative means, the jumping starting means operates the track jumping means in an intermediate position between consecutive address parts.

10. The optical disc device according to claim 1, wherein the reproduction speed measuring means comprises address part detection means for detecting an address part on the information carrier and address part transit time measuring means for measuring a time at which a convergent point of an optical beam passes through the address part, a reproduction speed being measured by comparing a measuring result from the address part transit time measuring means with a predetermined time, and the jumping starting means operates the track jumping means by starting an application of an accelerating signal after the address part is detected and the predetermined time has passed thereafter, based on a measuring result from the reproduction speed measuring means.

11. The optical disc device according to claim 10, wherein the address part detection means comprises binarization means for converting an output signal from the track displacement detection means or a signal for reproduction of information on the information carrier into two values at a predetermined level in order to detect the address part on the information carrier.

12. The optical disc device according to claim 10, further comprising reproduction speed comparative means for comparing the reproduction speed measured by the reproduction speed measuring means with a predetermined reproduction speed, wherein when the measured reproduction speed is found to be faster than the predetermined reproduction speed as a result of comparison by the reproduction speed comparative means, the jumping starting means operates the track jumping means by starting an application of an accelerating signal such that an application timing of the accelerating signal is matched with a transit timing in the address part.

13. The optical disc device according to claim 12, wherein an application time of the accelerating signal by the track jumping means is set to be longer than a time measured by the address part transit time measuring means.

14. The optical disc device according to claim 10, further comprising reproduction speed comparative means for comparing the reproduction speed measured by the reproduction speed measuring means with a predetermined reproduction speed, wherein when the measured reproduction speed is found to be faster than the predetermined reproduction speed as a result of comparison by the reproduction speed comparative means, the jumping starting means operates the track jumping means by starting an application of an accelerating signal such that an application timing of a decelerating signal is matched with a transit timing in the address part.

15. The optical disc device according to claim 14, wherein an application time of the decelerating signal by the track jumping means is set to be longer than a time measured by the address part transit time measuring means.

16. The optical disc device according to claim 12, wherein the track jumping means comprises first track jumping means for shifting a convergent point of an optical beam from an arbitrary track to another neighboring track and second track jumping means for shifting a convergent point of an optical beam to another neighboring track by skipping one track therebetween, and the jumping starting means switches a time interval from the detection of the address part to the operation of the track jumping means between a time the first track jumping means is operated and a time the second track jumping means is operated.

17. The optical disc device according to claim 10, further comprising reproduction speed comparative means for comparing the reproduction speed measured by the reproduction speed measuring means with a predetermined reproduction speed,
wherein when the measured reproduction speed is found to be slower than the predetermined reproduction speed as a result of comparison by the reproduction speed comparative means, the jumping starting means operates the track jumping means in an intermediate position between consecutive address parts.

18. The optical disc device according to claim 1, wherein the reproduction speed measuring means comprises address part detection means for detecting an address part on the information carrier,
reproduction signal detection means for generating a signal for reproduction of information on the information carrier by a reflected light or a transmission light from the information carrier,
address readout means for reading out address information in the address part obtained by an output signal from the reproduction signal detection means,
radial position calculation means for calculating a radial position of a convergent point of an optical beam on the information carrier based on the address information from the address readout means and
rotation number measuring means for measuring a number of revolutions of the rotating information carrier, and
the jumping starting means operates the track jumping means by starting an application of an accelerating signal after the address part is detected and a predetermined time has passed thereafter, based on a measuring result from the reproduction speed measuring means.

19. The optical disc device according to claim 18, further comprising reproduction speed comparative means for comparing the reproduction speed measured by the reproduction speed measuring means with a predetermined reproduction speed,
wherein when the measured reproduction speed is found to be faster than the predetermined reproduction speed as a result of comparison by the reproduction speed comparative means, the jumping starting means operates the track jumping means by starting an application of an accelerating signal such that an application timing of the accelerating signal is matched with a transit timing in the address part.

20. The optical disc device according to claim 19, further comprising address part transit time measuring means for measuring a time at which a convergent point of an optical beam passes through the address part, wherein an application time of the accelerating signal from the track jumping means is set to be longer than a time measured by the address part transit time measuring means.

21. The optical disc device according to claim 18, further comprising reproduction speed comparative means for comparing the reproduction speed measured by the reproduction speed measuring means with a predetermined reproduction speed,
wherein when the measured reproduction speed is found to be faster than the predetermined reproduction speed as a result of comparison by the reproduction speed comparative means, the jumping starting means operates the track jumping means by starting an application of an accelerating signal such that an application timing of a decelerating signal is matched with a transit timing in the address part.

22. The optical disc device according to claim 21, further comprising address part transit time measuring means for measuring a time at which a convergent point of an optical beam passes through the address part, wherein an application time of the decelerating signal from the track jumping means is set to be longer than a time measured by the address part transit time measuring means.

23. The optical disc device according to claim 19, wherein the track jumping means comprises first track jumping means for shifting a convergent point of an optical beam from an arbitrary track to another neighboring track and second track jumping means for shifting a convergent point of an optical beam to another neighboring track by skipping one track therebetween, and the jumping starting means switches a time interval from the detection of the address part to the operation of the track jumping means between a time the first track jumping means is operated and a time the second track jumping means is operated.

24. The optical disc device according to claim 18, further comprising reproduction speed comparative means for comparing the reproduction speed measured by the reproduction speed measuring means with a predetermined reproduction speed,
wherein when the measured reproduction speed is found to be slower than the predetermined reproduction speed as a result of comparison by the reproduction speed comparative means, the jumping starting means operates the track jumping means in an intermediate position between consecutive address parts.

25. The optical disc device according to claim 6, wherein the track jumping means comprises first track jumping means for shifting a convergent point of an optical beam from an arbitrary track to another neighboring track and second track jumping means for shifting a convergent point of an optical beam to another neighboring track by skipping one track therebetween, and the jumping starting means switches a time interval from the detection of the address part to the operation of the track jumping means between a time the first track jumping means is operated and a time the second track jumping means is operated.

26. The optical disc device according to claim 14, wherein the track jumping means comprises first track jumping means for shifting a convergent point of an optical beam from an arbitrary track to another neighboring track and second track jumping means for shifting a convergent point of an optical beam to another neighboring track by skipping one track therebetween, and the jumping starting means switches a time interval from the detection of the address part to the operation of the track jumping means between a time the first track jumping means is operated and a time the second track jumping means is operated.

27. The optical disc device according to claim 21, wherein the track jumping means comprises first track jumping means for shifting a convergent point of an optical beam from an arbitrary track to another neighboring track and second track jumping means for shifting a convergent point of an optical beam to another neighboring track by skipping one track therebetween, and the jumping starting means switches a time interval from the detection of the address part to the operation of the track jumping means between a time the first track jumping means is operated and a time the second track jumping means is operated.

* * * * *